United States Patent [19]

Look

[11] 4,027,208
[45] May 31, 1977

[54] INTERFACING CIRCUIT

[75] Inventor: Thomas F. Look, New Brighton, Minn.

[73] Assignee: Minnesota Mining and Manufacturing Company, St. Paul, Minn.

[22] Filed: Apr. 14, 1976

[21] Appl. No.: 676,760

[52] U.S. Cl. .............................................. 361/194
[51] Int. Cl.² ......................................... H01H 47/04
[58] Field of Search .... 317/135 R, 135 A, 148.5 R, 317/148.5 B, 154, 157

[56] References Cited

UNITED STATES PATENTS

| | | | |
|---|---|---|---|
| 3,097,307 | 7/1963 | Bonn | 317/135 A |
| 3,400,304 | 9/1968 | Ziegler | 317/135 A |
| 3,931,550 | 1/1976 | Dalpee | 317/148.5 R |

Primary Examiner—Harry E. Moose, Jr.
Attorney, Agent, or Firm—Cruzan Alexander; Donald M. Sell; Robert L. Marben

[57] ABSTRACT

An interfacing circuit for use in industrial control systems which provide one or more control signals of low power level from integrated semiconductor circuits. The low power level control signals initiate operation of the interfacing circuit to complete a current path from a power source to an electrical load in the control system. Buffer circuits are provided as a part of the interfacing circuit for receiving the lower power level control signals. A reed relay is operated initially by the low power level signals. The relay has a normally open set of contacts which when operated completes the current path from a power source to the electrical load. The interfacing circuit includes a holding current path for the relay. A number of diodes are provided in the interfacing circuit for preventing unwanted current flow in various areas of the circuit under certain circumstances.

6 Claims, 1 Drawing Figure

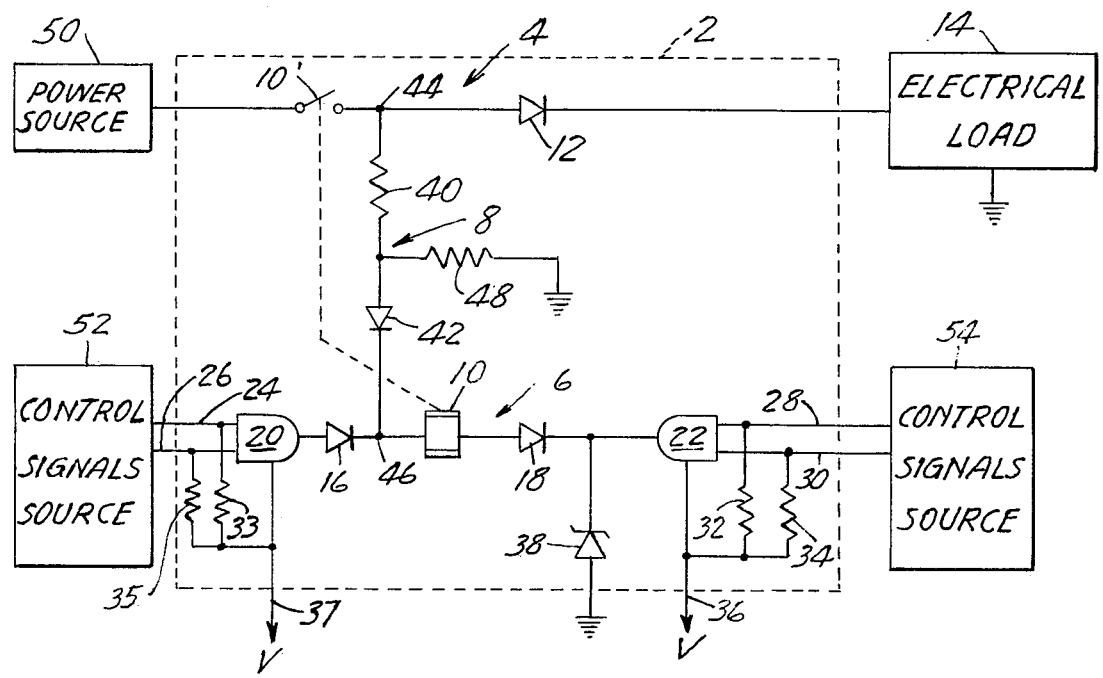

INTERFACING CIRCUIT

BACKGROUND OF THE INVENTION

This invention relates to a circuit which can be made in module form for providing interfacing circuitry between low power level control signal generating circuits and electrical loads and particularly for interfacing between such loads and control signal generating circuits which are particularly noise sensitive.

Tremendous strides have been made in recent years devising new integrated semiconductor circuits which can be arranged to generate control signals for use in initiating and terminating the energization of various electrical loads. However, such circuits provide only low power level control signals so many electrical loads cannot be operated directly by the lower power level control signals making it necessary to provide interfacing circuits responsive to the low power level control signals to provide the necessary connection of the electrical loads to an appropriate power source.

If an interfacing circuit is to be usable in the design of various industrial control circuits which use integrated semiconductor circuits such as timers, counters, sequences and the like, it is essential that the interfacing circuit provide noise signal protection for such integrated semiconductor circuitry. Noise signals, such as may be due to radio frequency generated signals, if of sufficient duration and magnitude and impressed on some integrated semiconductor circuits, can cause false indications and/or damage the semiconductor circuits.

SUMMARY OF THE INVENTION

The interfacing circuit according to this invention is usable with integrated semiconductor circuits which supply the signals needed to initiate and terminate operation of the interfacing circuit for operation of an electrical load in a control system and provides ample protection of the connected semiconductor integrated circuits from extraneous detrimental noise signals.

Briefly, the interfacing circuit according to this invention includes a reed relay having a set of contacts connected in series with unidirectional current conducting device in a first circuit portion for providing a current path between a source of electrical power and an electrical load. A second circuit portion is provided for initiating the energization of the winding of the reed relay to operate the contacts in the first circuit portion. Energization of the relay winding is controlled by low power level control signals. The second circuit portion includes a first buffer circuit connected to one end of the relay winding via a unidirectional current conducting device with the other end of the relay winding connected to a second buffer circuit via a unidirectional current conducting device. Each of the buffer circuits are connected at opposite ends of the second circuit as input devices used to connect with control signals such as low level power signals provided by integrated semiconductor circuitry. A current limiting resistor is included in a third circuit portion connected between the first buffer circuit end of the relay winding and the connection common to the set of contacts and the unidirectional current conducting device of the first circuit portion to provide holding circuit portion for the relay once it has been energized. In addition, the second circuit portion may include a resistor for each buffer circuit input to provide additional noise isolation. Each such resistor is connected between an input of the buffer circuit and the voltage input for the buffer circuit.

Still further noise signal protection may be provided by including a Zener diode in the second circuit portion. The Zener diode is connected between ground and the point intermediate, the second buffer circuit and the connecting unidirectional current conducting device.

The versatility of the interfacing circuitry is enhanced by providing a unidirectional current conducting device in the third circuit portion and connecting it in series with the current limiting resistor. This makes it possible to energize the relay winding by applying a signal at the juncture of the relay winding and the third circuit without allowing the signal to pass to the first circuit portion and operate any electrical load that may be connected to it. In addition, another resistor can, if desirable, be included in the third circuit portion and connect from the relay winding side of the current limiting resistor to ground to reduce the voltage available at the relay winding. With the second resistor connected, a power source providing a larger voltage output can be connected to the first circuit portion.

The unidirectional current conducting devices are provided to prevent current flow in certain directions in the circuitry to either protect some of the elements or prevent unwanted operation of elements in the circuit or elements connected to the circuit.

DRAWINGS

The invention will be best understood by reference to the following description taken in connection with the single FIGURE in which a circuit organization is schematically shown whereby the invention may be carried into effect and illustrates the best mode of the invention presently contemplated.

DESCRIPTION

Referring to the drawing, the circuitry shown within the dotted line 2 embodies the present invention with the circuit elements outside the dotted line 2 being connected to the circuitry to show its utility.

The circuitry shown within the dotted line 2 is capable of being assembled in modular form with one or more such circuits mounted on a single circuit board for use in a control system.

The circuitry embodying the present invention includes a first circuit portion 4, a second circuit portion 6 and a third circuit portion 8 which interconnects with the first and second circuit portions.

The first circuit portion 4 includes a set of contacts 10' positioned at the power source connecting end of circuit portion 4. The contacts are provided by a relay which is preferably, a reed relay, having its winding 10 connected as a part of circuit portion 6. A reed relay is preferred since it draws a small amount of current when energized. The contacts 10' are normally open and move to the closed position when the winding 10 is energized. A unidirectional current conducting device 12 such as a diode, is connected series with the contacts 10' and is poled so its cathode is connected to the load end of the circuit portion 6 to which an electrical load 14 is shown connected. A power source 50 connects to the contact 10' end of the first circuit portion 2.

The second circuit portion 6 includes the relay winding 10 and two unidirectional conducting devices, such as diodes 16 and 18, which are connected in series with the winding and at opposite ends of the winding. The cathode of diode 16 is connected to one end of the winding 10 while the anode of diode 18 is connected to the other end of winding 10. A first buffer circuit 20, illustrated by an AND gate, is also included in the second circuit portion and has its output connected to the anode of diode 16, while a second buffer circuit 22, also illustrated as an AND gate, is also included with the single terminal, which is usually viewed as the output of an AND gate, connected to the cathode of diode 18. The buffer AND gate 20 is shown with a plurality of input terminals. In the drawing, only two input terminals 24 and 26 are shown, though an AND gate with more can be used if needed. The buffer AND gate 22 is also a plural input device and is illustrated in the drawing with inputs 28 and 30. High ohmage resistors 32–35, one for each input terminal of the buffer AND gates 20 and 22, are provided. Resistors 32 and 34 connect input terminals 28 and 30, respectively, to the voltage input terminal 36 of the buffer AND gate 22, while resistors 33 and 35 connect terminals 24 and 26, respectively, to the voltage input terminal 37 of buffer AND gate 20. A Zener diode 38 is shown connected between the cathode of diode 18 and ground as another element of the second circuit portion 6. The Zener diode 38 is not essential, but does serve to prevent any noise signals in excess of the breakdown voltage of the Zener diode from reaching the buffer AND gate 22 thereby providing additional protection of the integrated semiconductor circuitry when used for use as the source of control signals for buffer AND gate 22.

The third circuit portion 8 includes a current limiting resistor 40 and may have a unidirectional current conducting device such as a diode 42 connected in series with it. The circuit portion 8 is connected at one end to the connection 44 that is common to the set of contacts 10' and diode 12. The other end of circuit portion 8 is connected to the connection 46 that is common to diode 16 and the winding 10. A resistor 48 may also be used as a part of the circuit portion 8 and is provided when the voltage from a power source applied to the first circuit portion is in excess of that provided by a power source when only the resistor 40 is used in the third circuit portion 8. The resistor 48 is connected between ground and the winding 10 end of resistor 40 to provide a voltage divider so the current passed via the relay winding 10 when the contacts 10' are closed will be at an acceptable level. The third circuit portion 8 is provided to complete a path for current flow through the relay winding 10 to maintain the contact set 10' closed once the relay winding 10 is energized.

The circuitry described is very useful in the design of industrial control systems as it provides a simple and effective solution to the problem of providing interfacing circuitry for operating various electrical loads, such as a load 14, under the control of low power level control signals such as those provided from timers, counters, sequences and the like, which are designed using integrated semiconductor circuits. As mentioned earlier, such interfacing circuitry requires that the integrated semiconductor circuits be isolated from noise signals which could otherwise produce false indications and/or damage the semiconductor circuits.

The operation of the interfacing circuitry can best be understood when it is considered connected as a part of an industrial control system. Accordingly, a power source 50 provided for supplying power to the various electrically operated devices in a control system is shown connected to the contacts 10' end of the circuit portion 2. An electrical load 14 is shown connected to the cathode of diode 12. A first control signals source 52 is connected to the input terminals 24 and 26 of buffer AND gate 20, while a second control signals source 54 is connected to the input terminals 28 and 30 of buffer AND gate 22. While two separate control signals sources are shown, it should be appreciated that the control signals could be provided by a single source or from many sources in the control system.

The diodes 16 and 18 are poled to allow current flow through the relay winding 10 from the control signals source 52 to the control signals source 54. Accordingly, one condition for current flow to initially energize relay winding 10 requires that each of the input terminals 24 and 26 to the buffer AND gate 20 must receive a logical high signal from the source 52 at the same time in order to have a logical high signal present at the output of AND gate 20. Another condition that must be satisfied at the same time, if the winding 10 is to be energized, is that one or more of the input terminals 28 and 30 to the buffer AND gate 22 receive a logical low signal from the source 54. When these conditions are met, the winding 10 is energized causing the set of contacts 10' to close allowing current to flow from the power source 50 via the first circuit portion to the electrical load 14. In addition, upon closure of contacts 10' current flow is initiated from the power source 50 via the closed contacts 10' and the third circuit portion 8 and the relay winding 10 to the second control signals source 54 to hold the relay winding 10 energized independent of any control signals that are then applied from the control signals source 52 to the buffer AND gate 20. Termination of the current flow to the electrical load 14 is then determined by the control signals provided to buffer AND gate 22. A logical high signal on all of the inputs to the buffer AND gate 22 is needed to prevent further current flow through the relay winding 10 to cause the contacts 10' to open.

The function provided by the various diodes is important to the operation of the circuitry. The connection 46 is important to the use of the circuit as a part of an industrial control system as it provides a convenient point for energizing or de-energizing the winding 10 as may be required. Accordingly, a voltage applied to the connection 46 will cause the winding 10 to be operated independent of the control signals source 52 if one or more logical low signals are presented at the same time to the buffer AND gate 22 by the control signals source 54. The diode 42, in this case, prevents the voltage applied to connection 46 from influencing the load 14. Also, diode 16 prevents the buffer AND gate 20 from providing a ground or logical low signal with respect to connection 46 at any time. Similarly, if the winding 10 is energized and a ground is then applied to the connection 46, the winding 10 will be de-energized to open the contacts 10'. The diode 18 serves to prevent a logical high, if present from AND gate 22, from energizing the winding 10 when a ground is applied to connection 46.

In an actual circuit constructed in accordance with the foregoing description, 4081 type CMOS AND gates were used with resistors 32–35, inclusive, having a value of 200,000 ohms. IN4003 type diodes were used. A power source 50 providing 15 volts with resistor 40 having 390 ohms were used. The reed relay used was a type MRR1ADS-12 available from Struthers-Dunn, Inc., Pitman, New Jersey. The normally open set of contacts 10' provided by such relay have a half ampere rating. The control signals sources 52 and 54 were circuits using CMOS integrated circuits which provided signals of a level and duration sufficient for initially energizing the winding 10. It is only necessary with the reed relay used that the signals provided by the source 52 present a logical high of at least 12 volts for only one millisecond at one milliampere to cause the contacts 10' to close. CMOS integrated circuits are capable of providing signals of this magnitude. A Zener diode having a voltage breakdown level of 18 volts was used for the Zener diode 38.

While the buffer circuits 20 and 22 were illustrated using AND gates which provide for a plurality of input signals and provide the needed circuit isolation, other circuits can be used as buffer circuits. For example, a SCL 4050 type CMOS circuit, which is a buffer/converter circuit that is non-inverting, could be used in place of the buffer AND gates 20 and 22.

What is claimed is:

1. An interfacing circuit for use in industrial control systems to provide for operation of an electrical load from a power source including a relay having a winding and a set of normally open contacts; a first circuit portion in which said set of contacts is connected for providing a current path between the power source and the electrical load when said set of contacts are closed; a second circuit portion for initially energizing said relay winding to cause said set of contacts to close, said second circuit portion including a first buffer circuit and a second buffer circuit, each having at least one control signal input, said first and second buffer circuits connected at opposite ends of said second circuit portion for receiving control signals, said second circuit portion including first and second unidirectional current conducting devices and said winding electrically connected in series, said first device connecting said first buffer circuit to one end of said winding, said second device connecting said second buffer circuit to the other end of said winding, said first and second devices poled to permit current flow from said first buffer circuit to said second buffer circuit; and a third circuit portion connected between the electrical load side of said set of contacts and said one end of said winding, said third circuit portion including a current limiting resistor.

2. An interfacing circuit according to claim 1 wherein said third circuit portion includes a third unidirectional current conducting device connected in series with said current limiting resistor, said third unidirectional current conducting device poled for current flow toward said winding.

3. An interfacing circuit according to claim 1 wherein said third circuit portion includes a resistive portion connected between ground and the winding end of said current limiting resistor.

4. An interfacing circuit according to claim 1 wherein said second circuit portion includes a Zener diode connected between ground and the second buffer circuit side of said second device.

5. An interfacing circuit according to claim 1 wherein said first and second buffer circuits include a voltage input connection and said second circuit portion includes a resistor for each control signals input of said first and second buffer circuits connected to said voltage input connection and to the control signal input for the resistor.

6. An interfacing circuit according to claim 1 wherein said first circuit portion includes a unidirectional current conducting device connected to the in series with said set of contacts on the electrical load side of said contacts and poled for current flow to the electrical load end of said first circuit portion.

* * * * *